United States Patent [19]

Borsos

[11] Patent Number: 4,834,524
[45] Date of Patent: May 30, 1989

[54] NOSE SUPPORT FOR EYEGLASSES

[76] Inventor: John D. Borsos, 23F Parkview-Madison, Laurence Harbor, N.J. 08879

[21] Appl. No.: 204,580

[22] Filed: Jun. 9, 1988

Related U.S. Application Data

[63] Continuation-in-part of Ser. No. 165,419, Feb. 29, 1988, which is a continuation of Ser. No. 865,878, May 21, 1986, abandoned, which is a continuation-in-part of Ser. No. 615,128, May 30, 1984, abandoned.

[51] Int. Cl.$^4$ .......................... G02C 5/02; G02C 5/12
[52] U.S. Cl. .................................... 351/137; 351/138; 351/132; 351/88
[58] Field of Search ...................... 351/76, 77, 80, 88, 351/132, 137, 138, 139; 2/446

[56] References Cited

U.S. PATENT DOCUMENTS

| 2,677,988 | 5/1954 | Belgand | 351/137 X |
| 3,304,145 | 2/1967 | Hamm | |
| 4,506,961 | 3/1985 | Palmieri | 351/137 |

FOREIGN PATENT DOCUMENTS 2923038 12/1979 Fed. Rep. of Germany .
308899 4/1929 United Kingdom ................ 351/138

Primary Examiner—Rodney B. Bovernick
Attorney, Agent, or Firm—Arthur L. Lessler

[57] ABSTRACT

A high compliance flexible web, preferably made of porometric material such as a woven plastic fabric, extends between the rims of a pair of eyeglasses below and spaced apart from the bridge which interconnects the rims. The web is preferably detachably and adjustably installed by engagement of protuberances at the ends of the web with corresponding recesses in the rims. The web supports the eyeglasses on the bridge of the nose of the wearer with very little slippage; and maintains a high comfort level by eliminating point contacts and local pressure concentrations, and permitting the movement of water vapor and air between the bridge of the nose of the wearer and the air space between the web and the bridge of the eyeglasses. The web adapts to the slope and shape of the upper portion of the nose of the wearer, either (i) by reason of the compliant nature of the web material or (ii) by adjustment of the web provided by positioning of protuberances at the ends of the web in selected holes in the rims and/or turning of the protuberances within the holes.

17 Claims, 5 Drawing Sheets

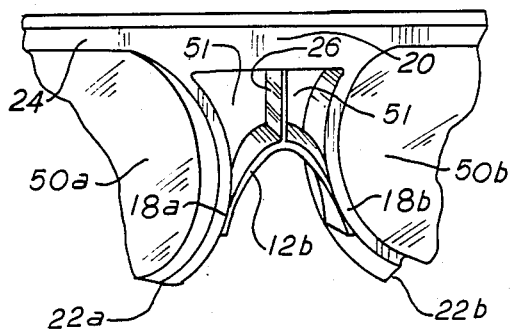
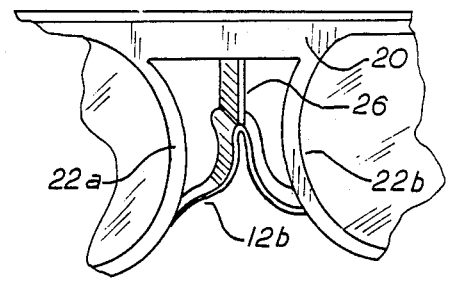
FIG. 1  FIG. 2
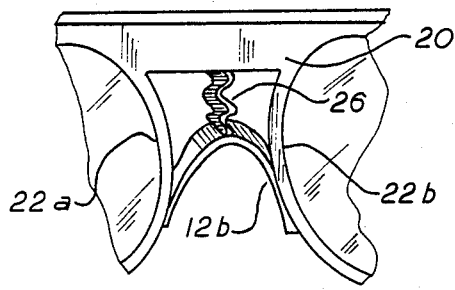
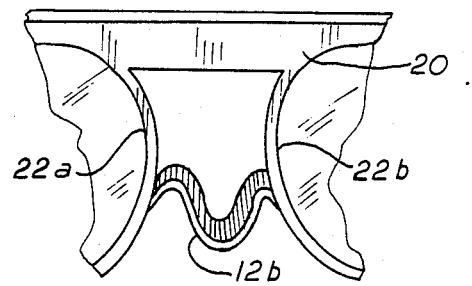
FIG. 3  FIG. 4
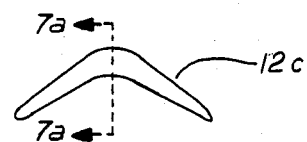
FIG. 7
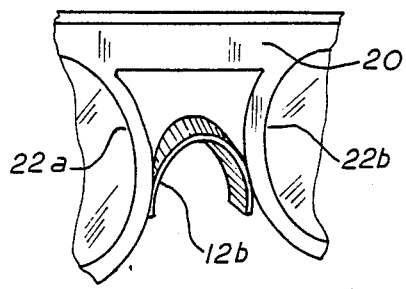
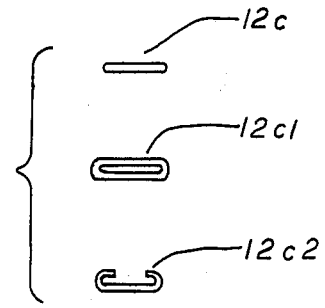
FIG. 5  FIG. 8

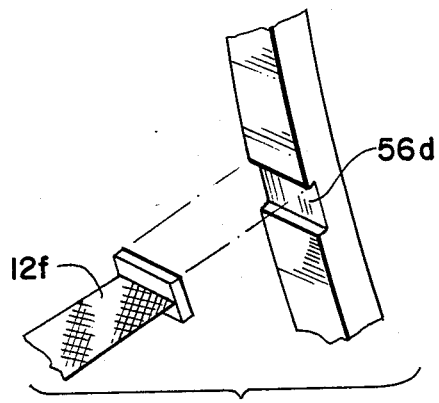
FIG. 15
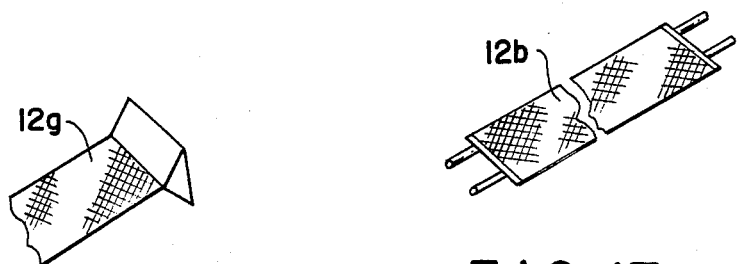
FIG. 16
FIG. 17
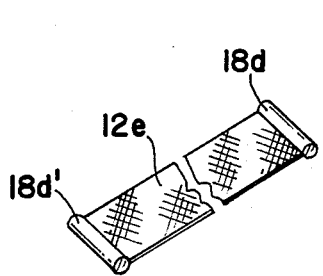
FIG. 18
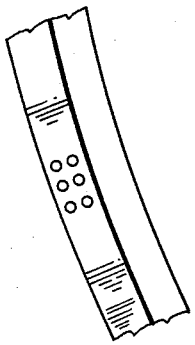
FIG. 20
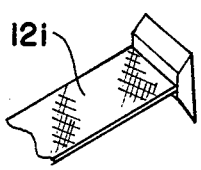
FIG. 19

NOSE SUPPORT FOR EYEGLASSES

REFERENCE TO RELATED APPLICATIONS

This application is a continuation-in-part of prior copending application Ser. No. 07/165,419, filed Feb. 29, 1988; which in turn is a continuation of prior copending application Ser. No. 06/865,878, filed May 21, 1986 and now abandoned; which in turn is a continuation-in-part of prior copending application Ser. No. 06/615,128, filed May 30, 1984 and now abandoned.

BACKGROUND OF THE INVENTION

This invention relates to a nose support for eyeglasses having improved performance and comfort characteristics. The invention is applicable to prescription eyeglasses as well as nonprescription safety glasses or sunglasses.

Eyeglasses normally comprise two adjacent rims which support corresponding lenses, with the rims being interconnected by a bridge which is configured to rest on the bridge of the nose of the wearer.

In many eyeglasses the bridge is made of a rigid material which cannot, of course, accurately conform to the shape of the bridge of the nose of the wearer. As a result, pressure is concentrated at the regions of contact between the bridge of the nose of the wearer and the bridge of the eyeglasses, resulting in discomfort to the wearer and reducing the area of contact and thus the frictional force retaining the eyeglasses in place, so that there is an increased tendency for the eyeglasses to slip down the nose of the wearer.

One approach that has previously been taken to solving the pressure concentration problem has been to customize the bridge support portion of the eyeglasses to the shape of the nose of the particular wearer. See U.S. Pat. No. 4,131,341 to James B. Bradley, Jr. However, such an arrangement is cumbersome, expensive, and does not adequately address the problem of providing increased comfort to the wearer.

In other efforts to alleviate these problems, resilient contact pads of various kinds have been provided which support the eyeglasses on the bridge of the nose of the wearer. Such contact pads have been connected either to the bridge of the eyeglasses or directly or indirectly to the rims of the eyeglasses, with the intent that the resilient qualities of the pads would allow them to better conform to the shape of the nose of the wearer, so as to distribute the force required to support the eyeglasses and thus reduce pressure concentrations and resulting discomfort. Such resilient contact pad arrangements are described, for example, in the following Patents:

British Patent No. 22,657 issued Apr. 29, 1898 to Thatcher;
U.S. Pat. No. 2,032,843 issued Mar. 3, 1936 to Grier;
U.S. Pat. No. 2,561,403 issued July 24, 1951 to Nelson;
U.S. Pat. No. 4,070,104 issued Jan. 24, 1978 to Rice; and
U.S. Pat. No. 4,243,306 issued Jan. 6, 1981 to Bononi.

Such resilient contact pads, however, also fail to provide an adequate level of wearer comfort; and the nature and shape of such pads tends to promote rather than reduce slippage on the nose of the wearer.

A support arrangement which enables adjustment of the position of the eyeglasses relative to the nose of the wearer, and which is intended for use with bifocals or trifocals, is described in U.S. Pat. No. 4,506,961 issued on Mar. 26, 1985 to Palmieri. In this arrangement what is essentially a movable bridge is provided by means of a strap 16 the ends of which are slidably secured to the eyeglass rims by means of clips 18, 19, 25. While the strap of Palmieri is obviously made of a flexible material, as is evident from the drawings of said patent, Palmieri does not identify the material involved.

In one embodiment of the Palmieri movable strip method of providing an adjustability feature, the central portion of the strap rests directly on the nose of the wearer. In another embodiment, two separate straps are employed merely as attachment devices for an interconnecting bridge 39 which rests on the nose of the wearer. Each strap is slidably movable on an adjacent rim of the eyeglasses. Both embodiments, however, are not designed with any purpose or means to provide an improved degree of wearer comfort and resistance to slippage.

The strap 24 of Palmieri provides a means of adjustment, but no added comfort, or elimination of slippage, or conformance to the shape of the nose of the wearer. In fact, in the arrangement of Palmieri there is actually a degradation from the normal suitability of the bearing surfaces to rest on the nose of the wearer. The Palmieri strap must necessarily be made of a hard, springy material to stay in the channels provided by the arrangement of Palmieri in the areas not immediately adjacent to the rim attaching clips; otherwise the strap would fall out of said areas.

The strap 24 of Palmieri also must necessarily be narrow to slidably fit into the slots 44 of the bridge so as to provide the desired adjustability, such narrowness providing a relatively small contact area with the nose of the wearer, with an accompanying excess concentration of pressure and resulting discomfort and objectionable slippage. Thus Palmieri compromises the comfort of the wearer in order to obtain his adjustability feature.

The Palmieri arrangement thus uses channels and clips on the rims of the eyeglasses to allow the central portion, which rests on the nose, to be raised or lowered. There is no suggestion of the use of a conformable highly compliant or pliable band or web to minimize slippage and improve comfort. In fact, such a band or web would lack sufficient stiffness to function in the arrangement of Palmieri.

Accordingly, an object of the present invention is to provide a relatively inexpensive nose support for eyeglasses which overcomes the disadvantages of prior art eyeglass nose supports.

SUMMARY OF THE INVENTION

As herein described, there is provided a nose support for eyeglasses having first and second lenses, first and second rims for holding said first and second lenses respectively, and a bridge interconnecting said rims, said bridge having a lower surface adjacent said rims. The nose support comprises a web disposed below and spaced apart from said bridge, the web preferably (but not necessarily) being of a high compliance conformable flexible material. The web has an upper surface adjacent the lower surface of the bridge and a lower surface parallel to said upper surface. First fastening means is provided for securing a first end of said web to a first part of said eyeglasses, preferably by engagement of a protuberance at said first end of said web with a recess in said first part of said eyeglasses, and second fastening means is provided for securing a second end of said web to a second part of said eyeglasses, preferably by engagement of a protuberance at said second end of said web with a recess in said second part of said eyeglasses. The web material is adapted to rest on and conform to the slope and shape of the adjacent portion of the nose of the wearer of the eyeglasses and to support the eyeglasses in such a manner that no intermediate portion of the web will normally contact the lower surface of the bridge.

IN THE DRAWING

FIG. 1 is a front isometric view showing a portion of a pair of eyeglasses having a nose support in accordance with a first embodiment of the present invention;

FIG. 2 is a front isometric view of the bridge portion of a pair of eyeglasses in accordance with said first embodiment of the invention wherein a highly compliant web is employed, as said portion appears when the eyeglasses are not being worn;

FIG. 3 is a front isometric view of the bridge portion of a pair of eyeglasses in accordance with said first embodiment of the invention, as said portion appears when the eyeglasses are being worn;

FIG. 4 is a front isometric view of the bridge portion of a pair of eyeglasses in accordance with another embodiment of the invention (wherein a highly compliant web is employed and the intermediate support 26 shown in FIGS. 1 and 2 is absent), as said portion appears when the eyeglasses are not being worn;

FIG. 5 is a front elevation view of the bridge portion of a pair of eyeglasses in accordance with said other embodiment of the invention, as said portion appears when (i) a highly compliant web is employed and the eyeglasses are being worn, or (ii) a slightly less compliant web is employed;

FIG. 7 is a top plan view of one possible configuration of the support web used in the eyeglasses shown in FIG. 6 unmounted and flattened;

FIG. 8 shows possible side cross-sectional views of the web shown in FIG. 7, taken along the cutting place 7a—7a therein;

FIG. 15 is an isometric view of a portion of an alternative form of attachment means of the web member and of the web-receiving portion of a rim of eyeglasses in accordance with a further embodiment of the invention;

FIGS. 16 to 19 show some alternative forms of attachment means of web members;

FIG. 20 shows an alternative form of the web-receiving portion suitable for use with the web of FIG. 17;

FIG. 21g illustrates a variation of the web-receiving portion of the eyeglass rim shown in FIG. 21a.

DETAILED DESCRIPTION

Figure 6:
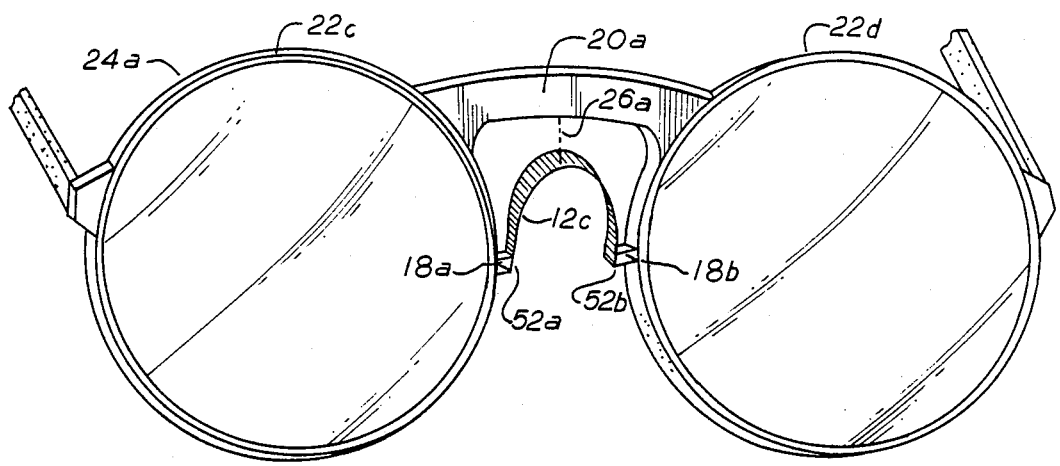
FIG. 6 is a front isometric view showing a portion of a pair of eyeglasses having a nose support in accordance with still another embodiment of the invention.
Figure 9:
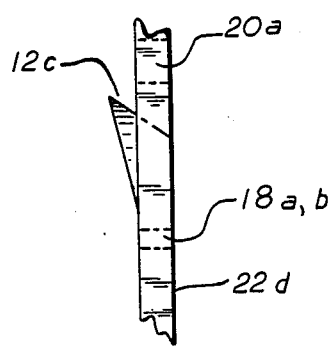
FIG. 9 is a right side view of the eyeglasses shown in FIG. 6.

As shown in FIG. 1, eyeglass lenses 50a and 50b are mounted in corresponding rims 22a and 22b of the eyeglasses 24. The rims 22a and 22b are interconnected by a relatively rigid bridge 20.

Connected between adjacent portions of the rims 22a and 22b in a region below and spaced apart from the bridge 20, is a web, band or strap 12b, the ends of which are secured to the rims 22a and 22b by suitable fastening elements 18.

An optional flexible web or flexible support 26 is secured at its upper end to the bridge 20: and the lower end of the support 26 is secured to an intermediate portion of the web 12b.

The use of a slightly resilient specially formed material for the web 12b provides a web which, when placed on the nose, exerts a very gentle inward pressure on the sides of the nose for special anti-slippage properties, useful when engaging in sports or other activities involving more than the normal extent of movement.

The optional support 26 is more of a positioning device than a supporting device, since the web 12b that it "supports" is extremely light. If support 26 were to be shortened to take out most (but not all) of the slack in web 12b, i.e. leaving web 12b with a little less slack than is shown in FIG. 2, the narrowness of the web 12b near its top and the resultant gentle pressure this configuration would create on the sides of the nose of the wearer near the top, would result in a decrease in pressure on the top midline of the nose when the eyeglasses 24 are worn, thus providing an effect similar to that of a specially formed slightly less resilient web especially suitable for sports and the like.

As shown in the embodiment of FIGS. 4 and 5, the support 26 is optional and may usually be dispensed with.

The flexible web 12b is preferably made of a high compliance porous material such as a woven plastic or man-made porometric material, or a suitable synthetic fabric such as Orlon or Dacron, although a homogeneous substance such as a soft plastic could be used. A natural fabric such as cotton may also be used for the web 12b, but a hypoallergenic material is preferred. If porous or porometric, the web 12b should preferably also be made so as to be removable for cleaning or inexpensive replacement.

Such a high compliance material permits the web 12b to conform completely and comfortably to the three-dimensional configuration of the nose of the wearer, with the web 12b supporting the eyeglasses 24 on the bridge of the nose of the wearer.

When a porous or porometric material is employed, the web 12b maintains a high comfort level by permitting the movement of water vapor and air through the web, between the bridge of the nose of the wearer and the air space 51 between the upper surface of the web 12b and the lower surface of the bridge 20. Air movement through the space 51 thus provides a drying and cooling effect for the portion of the skin of the nose in contact with the web 12b, by facilitating the evaporation of moisture from the skin, through the porous web 12b.

The lower surface of the web 12b, i.e. the surface that contacts the nose of the wearer, should preferably be made of a naturally textured or non-slip material or be finished with a non-slip surface so as to further minimize any tendency of the eye-glasses 24 to slide down the nose.

The fastening means 18 may comprise glue, Velcro, snap fastening means, a weld, a press fit, or the like. Preferably at least one of the fastening means 18 may provide for adjustment, e.g. via the use of inserts into recesses, Velcro or other fastening means, so that the length of the web 12b between the two fastening means 18 can be adjusted to vary the position of the eyeglasses on the wearer, and adjust the slope to approximate that of the nose of the wearer.

As shown in FIG. 2, the length of highly compliant versions of the web 12b is such that it has sufficient slack to enable the web 12b to conform to the shape of the nose of the wearer without any intermediate portion of the web 12b between the two fastening means 18 normally contacting the underside of the bridge 20.

Therefore the web 12b must be sufficiently long to permit it to assume a shape conforming to that of the adjacent portion of the nose of the wearer, while being sufficiently short so that normally no intermediate portion of the web contacts the lower surface of the bridge 20. With this arrangement, the web is basically out of contact with the frame (except, of course, at the ends of the web) and is free to move in various directions to conform to the width and shape of the nose of the wearer.

If desired, the web 12b may be impregnated with a small amount of a material which emits a pleasant-smelling aroma.

FIGS. 6 through 9 illustrate other embodiments of the invention and variations thereof.

The eyeglasses 24a shown in FIG. 6 have lens rims 22c and 22d interconnected by a bridge 20a.

Extending into the region below the bridge 20a from the rims 22c and 22d are respective fastening means 18a and 18b, each of said fastening means having any appropriate shape (a rectangular prism shape is shown in FIG. 6). The base of each of the fastening means 18a and 18b is attached to the corresponding rim and the front and back surfaces of said fastening means lie in planes substantially parallel to the planes of the rims. The rectangular surfaces of the inner ends 52a and 52b of the fastening means 18a and 18b may be covered with a hook-and-pile fastener material such as Velcro, or use other fastening means as shown for example in FIGS. 15, 21a, 21f and 21g, to allow for adjustability as well as provide for the means of attachment, and to facilitate removal and replacement of the web 12c.

The preferably highly compliant conformable flexible web 12c then has end portions to match the attachment means, so that the web 12c may be secured in position below the bridge 20a and between the rims 22c and 22d, by engagement of the ends of the web 12c with the inner ends 52a and 52b of the fastening means 18a and 18b.

For the embodiments shown in FIGS. 1 to 7 and 9, the web 12c is preferably shaped so the portion resting on the nose has a slant matching that of the nose in front elevation view. In the case of an arched web this is accomplished, as best seen in FIG. 7, by making the web such that when laid flat it has a generally V-shaped configuration, so that when the web is in place on the eyeglasses the central portion has a slant to approximate that of the top surface of the nose.

The high compliance of the web 12c permits it to precisely align itself with the nose surface of the wearer. The interaction of the ends of the web with the fastening means 18a and 18b detachably secure the web to the fastening means and permit the substitution of different webs to accomodate wearers having widely varying nose shape characteristics. Different web styles, designs and materials may also be used, as for sports activities, to match different clothing outfits, etc.

The web 12c may be made of any suitable non-resilient flexible natural or artificial material. An artificial material such as nylon, Orlon, Dacron or another plastic is preferred in order to preclude the growth of micro-organisms and to provide hypoallergenic qualities.

One version of the web 12c shown as 12c1 in FIG. 8 may be provided with a hollow interior 31. Another version shown as 12c2 in FIG. 8 may be provided with an open longitudinal central channel or slit which permits the insertion of disposable strips of various colors and types, for matching clothing, for facilitating use of strips impregnated with a mild aromatic substance, etc.

The web 12c can have perforations or be foraminous throughout, or can have an open weave, to provide improved heat and fluid transfer characteristics between the surface of the nose of the wearer and the surrounding atmosphere. The web 12c can alternatively be homogeneous, but preferably is of a permeable nature in that case.

The web 12c and its variations described above provides extraordinary comfort to the wearer, especially for eyeglasses which employ relatively thick lenses and are therefore relatively heavy; and does not exhibit the smooth, slippery configuration of prior art nose supports in the area of contact with the nose of the wearer.

Figure 10:
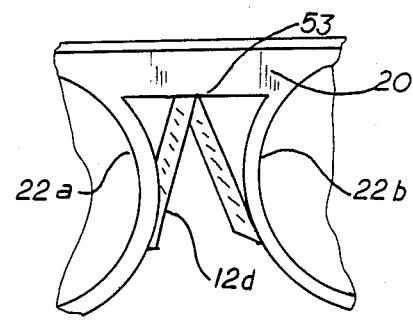
FIG. 10 is a front isometric view of the bridge portion of a pair of eyeglasses in accordance with still another embodiment of the invention.

FIG. 10 shows another embodiment of the invention which is generally similar to the embodiment shown in FIG. 4. The web 12d is made of the same material as the web 12b. The center of the web 12d is affixed to the bottom surface of the bridge 20 along a line 53 perpendicular to the plane of the rims 22a and 22b, so as to leave little or no slack in the web 12d and thus give said web an inverted V-shaped configuration, so that when the eyeglasses are worn, the top of the web 12d, i.e. the line 53 along which it is affixed to the bridge 20 of the eyeglasses 24, is out of contact with the nose of the wearer.

Figure 11:
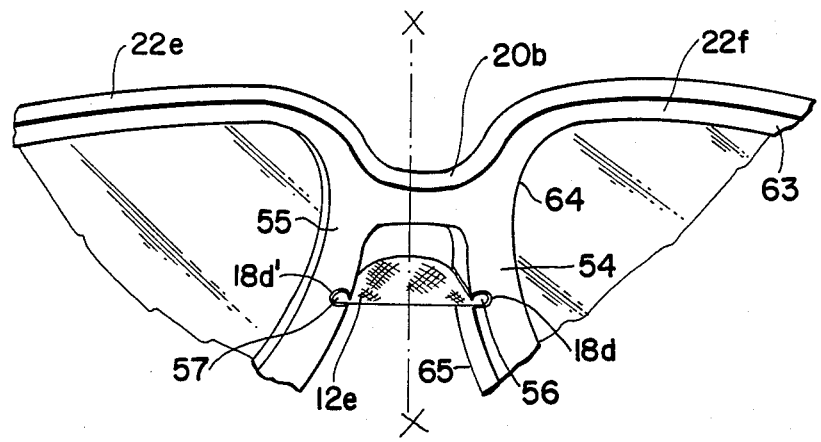
FIG. 11 is a front isometric view of a less arched bridge portion of a pair of eyeglasses in accordance with a further embodiment of the invention.

FIG. 11 shows another embodiment of the invention in which eyeglass rims 22e and 22f are interconnected by a bridge 20b, and which embodiment does not have the appreciably arched shape of the previous embodiments. The rims 22e and 22f are symmetrical with respect to a plane X—X midway between the rims and substantially perpendicular to the bridge 20b. Each rim has opposed generally parallel front and rear surfaces (front surface 63, the rear surface not being visible in FIG. 11) and adjacent generally concentric inner and outer surfaces 64 and 65 respectively.

A web member 12e (shown in better detail in FIG. 18) has a preferably conformable high compliance flexible web disposed below and spaced apart from the bridge 20b, with an air space between the bottom of the bridge and the top of the web.

Figure 12:
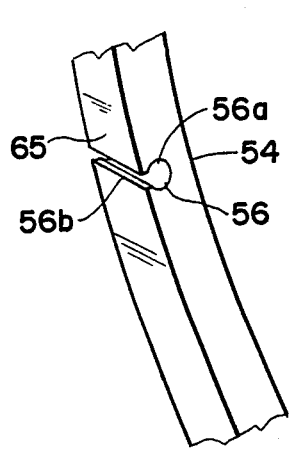
FIGS. 12 and 13 are isometric views of some alternative forms of the web-receiving portions of the rims of the eyeglasses.

The ends of the web member 12e have attachment members, in this case comprising cylindrical protuberances 18d and 18d', which are adapted to engage corresponding recesses 56 and 57 in web-receiving portions 54 and 55 of the rims 22f and 22e respectively, which web-receiving portions act as fastening means to retain the web member 12e in position. The recesses 56 and 57 are mirror images of each other, and as best seen in FIG. 12, each of said recesses is in the form of a hole 56a extending from the front toward the back of the respective rim (or vice versa), and a slit 56b extending from the hole 56a to the adjacent outer surface 65 of the rim. Each recess may extend a limited distance into the front (or back) surface of the rim, or (as shown in FIG. 12) may extend entirely through the rim between the front and back surfaces thereof. While the recesses 56 and 57 have been shown with circular cross-sections, they may alternatively have any desired non-circular cross-section, so long as the corresponding protuberances are shaped and/or dimensioned to conform thereto.

The web member 12e may be installed by pressing the protuberances 18d and 18d' into the corresponding holes 56a, in such a manner that the web itself extends through the slits 56b. The web member 12e may be removed by reversing the process to slide the protuberances 18d and 18d' out of the holes 56a. The web can alternatively be permanently formed or cemented in place.

Figure 13:
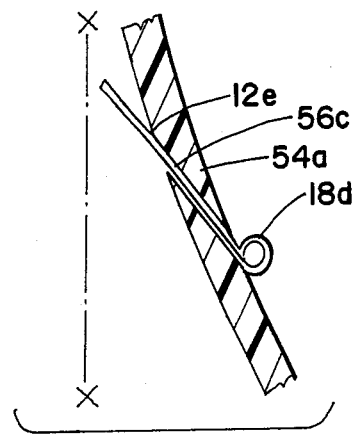

Instead of a hole-and-slit form of recess of the type shown in FIG. 11, the web-receiving portion of the rim 22f (and a mirror image portion of the rim 22e) may have a slit, similar to the example of 56c in FIG. 13, extending entirely through the rim between the inner and outer surfaces thereof, the slit 56c extending from the front of the rim 22f only part of the way toward the back thereof, or vice versa. The slit 56c in FIG. 13 is inclined upward toward the back to approximate the slope of the upper portion of the nose of the wearer. The conformable nature of the material of the web will allow compensation for normal differences from wearer to wearer. However, various eyeglasses may be provided with different values of the slope for selection purposes.

Figure 14A:
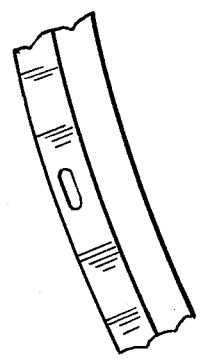
FIG. 14a shows a variation of the web receiving means shown in FIG. 14.
Figure 14:
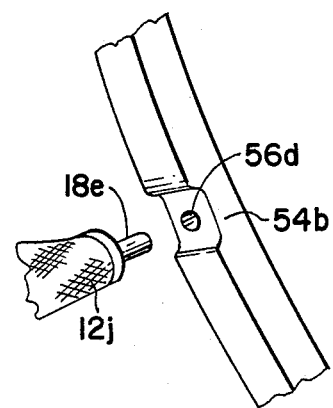
FIG. 14 is an isometric view of another attachment means of the web member and web-receiving portion of a rim of eyeglasses, in accordance with a further embodiment of the invention.

FIG. 14 shows a variation of the web attachment and web receiving means, in which the slope of the web of the web member 12j is adjustable. In this variation the rim 22f has a web-receiving portion 54b and the rim 22e has a web-receiving portion which is a mirror image thereof. The web-receiving portion 54b has a hole 56d. The cylindrical protuberance 18e of the web member 12j can turn in the hole 56d, so that the web member 12j may rotate to vary the slope of the web. When the eyeglasses are worn the weight of the eyeglasses causes the web member 12j to rotate in the appropriate direction to adapt to the slope of the upper portion of the nose of the wearer. The rim 22e is provided with a similar arrangement.

FIG. 15 shows another variation in which a web member 12f is provided at each end with a rectangular plug which is preferably press fitted into a matching hole in the web-receiving portion of the corresponding rim.

FIG. 16 shows a web member 12g having a protuberance in the form of a triangular prism at each end, for engaging a matching shaped hole in the web-receiving portion of the corresponding rim.

FIG. 17 shows a web member 12g having protuberances in the form of pins at each end, for press fitting into matching holes in the web-receiving portion of the corresponding rim. There could be a series of holes for adjustment purposes, as shown in the case of cylindrically shaped pins in FIG. 20.

FIG. 19 shows a web member 12i having a protuberance in the form of a trapezoidal prism at each end, for engaging a matching shaped hole in the web-receiving portion of the corresponding rim.

Figure 21A:
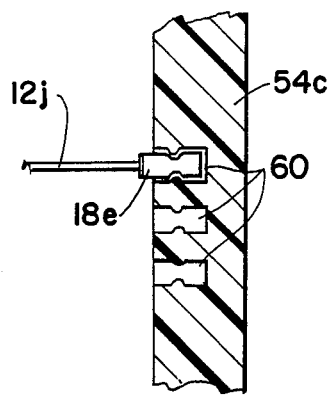
FIGS. 21a through 21d illustrate another form of attachment means of the web member and web-receiving portion of a rim of eyeglasses, in accordance with a further embodiment of the invention.

FIG. 21a is a partial cross-sectional front elevation view of a web-receiving portion 54c of the rim of eyeglasses according to a variation of the embodiment of the invention shown in FIG. 14, in which variation three circular holes 60 extend into the outer surface 65 of the rim, i.e. the surface of the rim adjacent the other rim of the eyeglasses. The purpose of providing more than one hole is to allow for adjustment of the position of the web 12j by inserting its corresponding cylindrical protuberance 18e (there are of course two such protuberances, one at each end of the web 12j) into the desired hole; and any desired number of holes may be provided for this purpose.

Figure 21B:
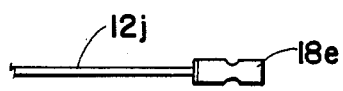
Figure 21C:
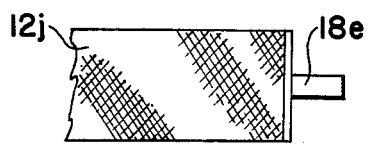
Figure 21D:
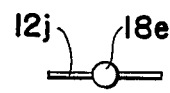

FIG. 21b is a front elevation view of the corresponding portion of the web 12j; FIG. 21c is a top plan view thereof; and FIG. 21d is a right side elevation view thereof.

In the arrangement of FIGS. 21a through 21d, the protuberances of the web 12j are rotatably disposed, or journalled, in the holes of the adjacent rims, so that the web 12j can be rotated about an axis extending from the holes in which the protuberances are disposed. This freedom of rotation allows for improved conformance of the web to the slope of the adjacent portion of the nose of the wearer. This also allows a wider choice of the material of the web, from great to little resilience.

Figure 21E:
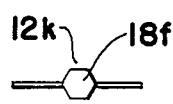
FIGS. 21e and 21f illustrate a variation of the embodiment shown in FIGS. 21a through 21d.
Figure 21F:
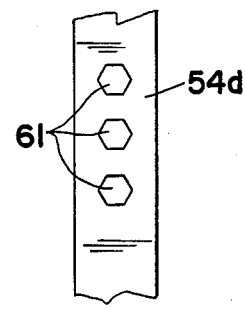
Figure 21G:
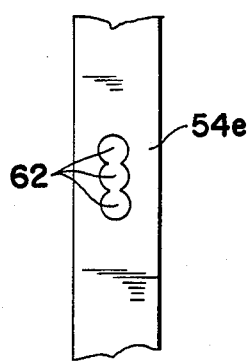

In order to make a finer adjustment possible, the holes may be overlapped as in the case of the holes 62 in a web-receiving portion 54e of an eyeglass rim, as shown in FIG. 21g, or the hole may be elongated into a slot 58 shown in FIG. 14a.

Instead of providing the rim holes 60 with a circular shape in order to allow free rotational movement, holes of regular polygonal or other non-circular multi-sided cross-section may be provided, e.g. the hexagonal holes 61 of the eyeglass rim web-receiving portion 54d shown in FIG. 21f, to provide for a selection of specific web angle values. A right side elevation view of the corresponding end of a mating web 12k having hexagonal protuberances 18f is shown in FIG. 21e.

In the embodiments illustrated in FIGS. 11 et seq., the web may be under tension so that the web member, though slanted forward, is generally parallel to the bridge 20b; or the web may be somewhat curved if it is made in a manner to have some slack therein. The length of the web member extending between the rims 22e and 22f may be selected by providing web members of different sizes. This would provide different characteristics for different people and purposes, as for sports vis-a-vis reading; and would also act to raise or lower the eyeglasses.

The web member is preferably made as a unitary part, with the protuberances at the ends thereof being formed integrally with the web itself. If the web comprises a material which is non-degradable, such as soft plastic, the web member may be cemented or otherwise made a permanent part of the eyeglasses. The protuberances of the web member would normally be of relatively small size in order to maintain a proper scale relative to the eyeglass rims.

I claim:

1. A nose support for eyeglasses having first and second lenses, first and second rims for holding said first and second lenses respectively, and a bridge interconnecting said rims, said bridge having a lower surface adjacent said rims, said nose support comprising:
   a web disposed below and spaced apart from said bridge, said web having an upper surface adjacent the lower surface of said bridge and a lower surface parallel to said upper surface;
   first fastening means for securing a first end of said web to a first part of said eyeglasses;
   second fastening means for securing a second end of said web to a second part of said eyeglasses;
   each said fastening means comprising a portion of the corresponding rim having a hole therein for receiving the corresponding attachment member, and slit for receiving the adjacent portion of said web, said slit extending from said hole to an outer surface of the corresponding rim adjacent said bridge;
   each end of said web having an attachment member secured thereto,
      each attachment member comprising a protuberance adapted to engage a corresponding recess of one of said fastening means so that the attachment member is retained by the fastening means in such a way as to resist movement of the attachment member toward the rim remote from the corresponding fastening means;
   said web being adapted to rest on the nose of the wearer of said eyeglasses and to support said eyeglasses in such a manner that no intermediate portion of the web will normally contact the lower surface of the bridge.

2. The nose support according to claim 1, wherein each said hole has a noncircular cross-section and the corresponding attachment member has a matching cross-section.

3. A nose support for eyeglasses having first and second lenses, first and second rims for holding said first and second lenses respectively, and a bridge interconnecting said rims, said bridge having a lower surface adjacent said rims, said nose support comprising:
   a web disposed below and spaced apart from said bridge, said web having an upper surface adjacent the lower surface of said bridge and a lower surface parallel to said upper surface;
   first fastening means for securing a first end of said web to a first part of said eyeglasses;
   second fastening means for securing a second end of said web to a second part of said eyeglasses;
   each said fastening means comprising a slit in a portion of the corresponding rim for receiving a portion of the web, said slit being oriented at an angle such that the slope of the web approximates the slope of the upper portion of the nose of the wearer;
   each end of said web having an attachment member secured thereto,
      each attachment member comprising a protuberance adapted to engage a corresponding recess of one of said fastening means so that the attachment member is retained by the fastening means in such a way as to resist movement of the attachment member toward the rim remote from the corresponding fastening means;
   said web being adapted to rest on the nose of the wearer of said eyeglasses and to support said eyeglasses in such a manner that no intermediate portion of the web will normally contact the lower surface of the bridge.

4. The nose support according to claim 1 or 3, wherein each attachment member is journalled within the corresponding fastening means.

5. The nose support according to claim 1 or 3, wherein each protuberance is circular and each hole has a circular cross-section.

6. The nose support according to claim 5, wherein each protuberance is rotatably disposed in the corresponding hole.

7. The nose support according to claim 1 or 3, wherein each protuberance is non-circular and each hole has a similar non-circular cross-section.

8. The nose support according to claim 7, wherein each protuberance has a regular polygonal cross-section and each hole has a similar regular polygonal cross-section.

9. The nose support according to claim 1 or 3, wherein each of said rims has a plurality of adjacent holes therein.

10. The nose support according to claim 9, each of said protuberances being positionable at a variety of rotational positions within a corresponding one of said holes, so as to allow adjustment of the height of said bridge and the slope of said web relative to the upper portion of the nose of the wearer.

11. A nose support for eyeglasses having first and second lenses, first and second rims for holding said first and second lenses respectively, and a bridge interconnecting said rims, said bridge having a lower surface adjacent said rims, said nose support comprising:
   a web disposed below and spaced apart from said bridge, said web having an upper surface adjacent the lower surface of said bridge and a lower surface parallel to said upper surface, leaving an air space between the lower surface of said bridge and the upper surface of said web, said web extending between adjacent attachment portions of said first and second rims respectively;
   first fastening means for securing a first end of said web to said attachment portion of said first rim;
   second fastening means for securing a second end of said web to said attachment portion of said second rim,
   each end of said web having an attachment member secured thereto, said attachment members being symmetrically disposed with respect to a plane midway between said rims and substantially perpendicular to said bridge,
   each attachment member being adapted to engage a corresponding one of said fastening means so that the attachment member is retained by the fastening means in such a way as to resist movement of the attachment member toward the rim remote from the corresponding fastening means;
   each said fastening means comprising a portion of the corresponding rim having a hole therein for receiving the corresponding attachment member, and a slit for receiving the adjacent portion of said web, said slit extending from said hole to an outer surface of said rim adjacent said bridge;
   said web being adapted to rest on the nose of the wearer of said eyeglasses and to support said eyeglasses in such a manner that no intermediate portion of the web will normally contact the lower surface of the bridge.

12. The nose support according to claim 10, wherein each attachment member is formed integrally with said web.

13. The nose support according to claim 10, wherein each of said attachment members is detachably engaged with the corresponding fastening means.

14. The nose support according to claim 10, wherein said slit is oriented at an angle such that the slope of the web approximates the slope of the upper portion of the nose of the wearer.

15. The nose support according to claim 10, wherein each said hole has a noncircular cross-section and the corresponding attachment member has a matching cross-section.

16. The nose support according to claim 10, wherein each fastening means is journalled within the corresponding attachment member.

17. A nose support for eyeglasses having first and second lenses, first and second rims for holding said first and second lenses respectively, each rim having opposed generally parallel front and rear surfaces adjacent generally concentric inner and outer surfaces, and a bridge interconnecting said rims, said bridge having a lower surface adjacent said rims, said nose support comprising:

a web disposed below and spaced apart from said bridge, said web having an upper surface adjacent the lower surface of said bridge and a lower surface parallel to said upper surface;

a plurality of adjacent overlapping holes in the outer surface of said first rim; and a plurality of adjacent overlapping holes in the outer surface of said second rim;

each end of said web having a protuberance adapted to engage a corresponding hole in the outer surface of one of said rims;

said web being adapted to rest on the nose of the wearer of said eyeglasses and to support said eyeglasses in such a manner that no intermediate portion of the web will normally contact the lower surface of the bridge.

* * * * *